UNITED STATES PATENT OFFICE.

JENS CHRISTIAN BENNECHE, OF CHRISTIANIA, NORWAY.

PAINT.

1,287,836. Specification of Letters Patent. Patented Dec. 17, 1918.

No Drawing. Application filed March 25, 1918. Serial No. 224,606.

*To all whom it may concern:*

Be it known that I, JENS CHRISTIAN BENNECHE, citizen of Norway, residing at Tordenskjolds Plads 3, Christiania, Norway, have invented new and useful Improvements in Paints, of which the following is a specification.

The present invention has for its object to provide a paint, which is distinguished by possessing a large covering power and a high resistance as regards high temperatures. It contains linseed oil, petroleum, resin, lime, soap, etc., and the proportion of constituents is as follows:

| | |
|---|---|
| Boiled linseed oil | 40 liters. |
| Petroleum | 40 " |
| Light resin | 16 kg. |
| Quick lime slaked with a sufficient quantity of water | 5 " |
| Yellow soap | 10 " |
| Dry color | 75 " |
| Siccatives or drying oil | 5 liters. |

In preparing this paint, the following four products are firstly produced:

(1) 16 kg. light resin is melted in 10 liters of boiled linseed oil, so that a varnish is obtained.

(2) 75 kg. dry color is mixed with so much oil and petroleum that a soft paste is obtained.

(3) 5 kg. burnt lime is slaked with water, so that a paste is obtained.

(4) 10 kg. (7 large sticks) yellow soap (woolen stuff soap, Liverpool-soap) is boiled with 4 liters of water until dissolved. Then it is cooled so as to form a jelly-like mass.

Nos. 2 and 3 of the products thus obtained are mixed together with the remaining oil and petroleum. Product —4— is added before all oil is intermixed, whereupon product —1— is added. The siccative or drying oil is added last.

If white color has to be used in this paint, it should be zinc-white or so-called lithopone, because whitelead is not stable in combination with the lime.

A paint produced as above described has proved to possess a very large covering power. For instance, it should be mentioned that it covers about 3 times as much as ordinary paint upon rough or porous wall surfaces. This property is principally due to the presence of lime.

The soap has the effect of rendering the paint capable of resisting high temperatures. Even at 180 degrees C. the paint does not fissure or form blisters.

The paint is water proof or oil proof, is not influenced by water, can be applied and dry even under water and attached to tar, carbolineum, soaked wood, metal, rust, exudations, fatty or oiled surfaces, etc.

In addition to possessing the same properties as ordinary paint, it may be used in any case in which the ordinary paint is used, outside as well as inside, further as a protecting substance and for the purpose of decoration. Its appearance is like to that of enamel paint. The light colors are not injured by sulfur, coal gas or other vapors.

Having now described my invention, what I claim as new and desire to secure by Letters Patent is:

1. Paint containing linseed oil, petroleum, resin, lime, soap.

2. Paint containing linseed oil, petroleum, resin, lime, soap, characterized by the following proportion of the constituents, 40 liters boiled linseed oil, 40 liters petroleum, 16 kg. light resin, 5 kg. slaked lime, 10 kg. yellow soap distributed in 4 liters water, 75 kg. color and 5 liters of drying oil.

3. Process of producing a paint as claimed in claim 2, consisting in firstly preparing separately the following four products: (1) 16 kg. resin is melted in 10 liters boiled linseed oil, (2) 75 kg. dry color mixed with a sufficient quantity of linseed oil and petroleum to form a paste, (3) 5 kg. quick lime slaked with water to form a paste, and (4) 10 kg. yellow soap dissolved in water and cooled so as to form a jelly-like mass, whereupon the products (2) and (3) are mixed with the remaining oil and petroleum, the product (4) is added before all oil is intermixed, the product (1) is then added, the drying oil being added last.

In testimony whereof I have signed my name to this specification.

JENS CHRISTIAN BENNECHE.

Witnesses:
 AXEL LAHN,
 MOGENS BUGGE.